No. 762,334. PATENTED JUNE 14, 1904.
C. MONIN.
PULLEY OF VARIABLE DIAMETER.
APPLICATION FILED DEC. 8, 1903.
NO MODEL.
FIG. 1.
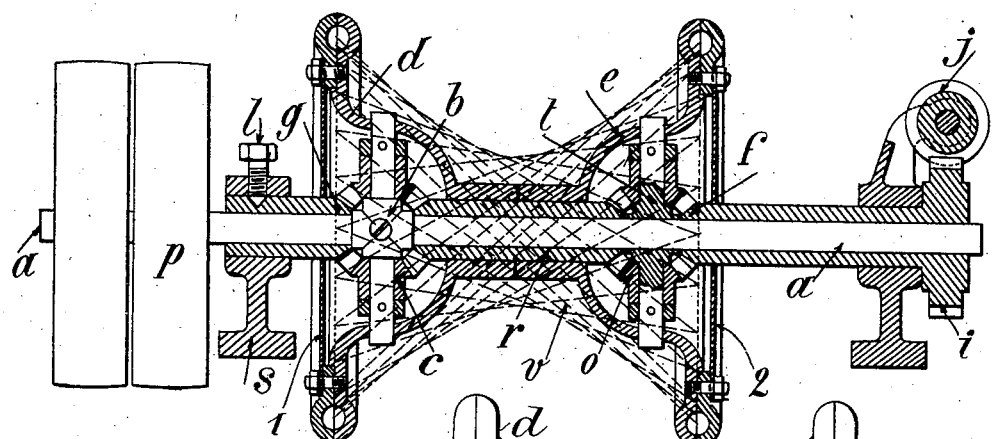
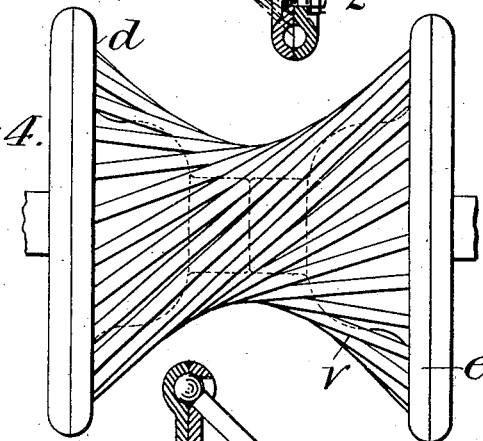
Fig. 4.
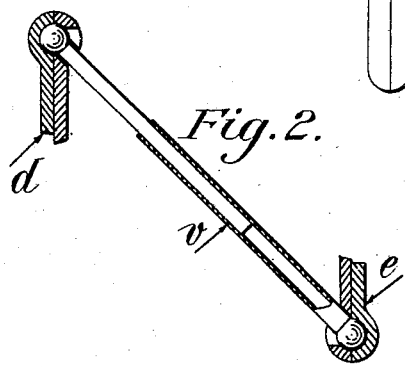
Fig. 2.
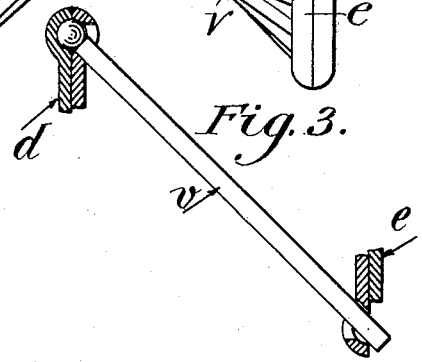
Fig. 3.
WITNESSES
H. M. Kuehne
John A. Percival
INVENTOR
Charles Monin
BY Richardson
ATTORNEYS No. 762,334. Patented June 14, 1904.

UNITED STATES PATENT OFFICE.

CHARLES MONIN, OF LE MANS, FRANCE.

PULLEY OF VARIABLE DIAMETER.

SPECIFICATION forming part of Letters Patent No. 762,334, dated June 14, 1904.

Application filed December 8, 1903. Serial No. 184,336. (No model.)

*To all whom it may concern:*

Be it known that I, CHARLES MONIN, civil engineer, a citizen of the French Republic, and a resident of 161 Avenue de la République, Le Mans, Sarthe, in the Republic of France, have invented certain new and useful Improvements in Pulleys of Variable Diameter, of which the following is a specification.

My invention relates to an improved construction of pulley the diameter of which can be varied at full motion to change the speed transmitted. This pulley is characterized by the combination of a hyperbolic deformable drum with a differential-motion mechanism arranged, together with the plates of said drum, in such a manner as to form a whole occupying a very small space, working very regularly, and being of a low cost price, owing to the interchangeability of its various parts and to the little wear of same, the gears being kept continuously dipped in oil.

The accompanying drawings illustrate clearly the construction of my improved pulley.

Figure 1 is a longitudinal section of the whole, the rods of the hyperbolic drum being simply illustrated in dotted lines. Figs. 2 and 3 are details of two means for joining the rods of the plates of the hyperbolic drum. Fig. 4 is a side elevation of the pulley.

The whole of the pulley comprises, first, two cup-shaped plates $d$ and $e$, the openings of which are turned to the outside. These plates are mounted on the shaft $a$ of the pulley and connected to said shaft by means of a differential-motion mechanism consisting of a series of interchangeable conical pinions arranged, respectively, in the cavities of the two plates. These plates are closed on the outside by thin metal sheets 1 and 2, forming thus tight cases which can be filled with oil to bathe continuously the pinions of the differential-motion mechanism. The two plates are connected together by means of bands or rods $v$, pivoted by means of universal joints at their two ends, as shown in Fig. 2, and formed each of two parts sliding one inside the other or pivoted simply at one end and sliding loosely by their other ends in enlarged holes provided for in the second plate, as shown in Fig. 3. If the plates are rotated one with relation to the other, the rods are inclined more or less and form an hyperboloid the central diameter of which diminishes or augments. When the rods are parallel, the surface of the drum is cylindrical. This construction is particularly remarkable because it allows by very simple means to change at will and with the least effort possible the diameter of the pulley while it is in motion.

On the shaft $a$ is keyed inside the case formed by the plate $d$ a cross-shaped pinion-support $b$, secured also to the plate $d$. On this support $b$ are loosely mounted two conical pinions or planetary gears $c$ $c$. These pinions are hence driven by the rotary motion of the shaft $a$; but as they are continuously engaged with a stationary pinion $g$, fixed to the frame $s$ by means of a screw $l$, for instance, they turn about themselves while turning with the shaft $a$ and cause a double central pinion $r$, loosely mounted on the shaft $a$ and with which they are engaged, to be rotated at a speed double that of said shaft $a$. The movement of rotation of the double pinion $r$ is transmitted to the planetary pinions $o$, loosely mounted on a second cross-shaped support $t$, which is itself loose on the shaft $a$, but which is secured to the second plate $e$. The pinions $o$ engage also with a pinion $f$, loosely mounted on the shaft $a$, but made integral with a worm-wheel $i$, gearing with a stationary worm $j$, secured to the frame. As long as the worm $j$ is not operated the pinion $f$ is quite stationary, and the planetary pinions $o$, having bearing-points on the teeth of said pinion $f$, will be driven by the pinion $r$ in a rotary motion about the shaft $a$ at a speed half that of the pinion $r$—that is to say, at the same speed as that of the shaft $a$.

When it is desired to vary the diameter of the pulley, it is only necessary to rotate the worm $f$ to a certain extent. This results in an angular displacement of pinion $f$ on the shaft $a$, which retards or increases the movement of the support $t$, carrying the pinion, and hence the speed of the plate $e$ with regard to the movement of the plate $d$, thus deforming the series of rods $v$.

The shaft $a$ is driven by one of the pulleys $p$ or by any other suitable means.

Having now described my invention, what I claim as new, and desire to secure by Letters Patent, is—

1. A pulley of variable diameter by hyperbolic deformation comprising a shaft $a$, two independent plates $d$ and $e$ loosely mounted on said shaft, rods $v$ connecting said plates and pivoted to same, and provided with means for automatically changing their length as the plates turn one with relation to the other, a cross-support $b$ keyed on the shaft $a$ and fixed to the plate $d$, two planetary pinions $c$ loosely mounted on the cross-support $b$, a pinion $g$ fixed to the frame and gearing with the planetary pinions $c$, a second cross-support $t$ loosely mounted on the shaft $a$ and fixed to the plate $e$, two planetary pinions $o$ loosely mounted on the cross-support $t$, a pinion $f$ loosely mounted on shaft $a$ and gearing with the planetary pinions $o$, means for rotating or rendering stationary the pinions $f$ and a double pinion $r$ revolving loosely on shaft $a$ and gearing simultaneously with the planetary pinions $c$ and $o$, substantially as and for the purpose set forth.

2. A pulley of variable diameter by hyperbolic deformation comprising a shaft $a$, two independent plates $d$ and $e$ loosely mounted on said shaft, rods $v$ connecting said plates and pivoted to same, and provided with means for automatically changing their length as the plates turn one with relation to the other, a cross-support $b$ keyed on the shaft $a$ and fixed to the plate $d$, two planetary pinions $c$ loosely mounted on the cross-support $b$, a pinion $g$ fixed to the frame and gearing with the planetary pinions $c$, a second cross-support $t$ loosely mounted on the shaft $a$ and fixed to the plate $e$, two planetary pinions $o$ loosely mounted on the cross-support $t$, a double pinion $r$ revolving loosely on shaft $a$ and gearing simultaneously with the planetary pinions $c$ and $o$, a pinion $f$ loosely mounted on shaft $a$ and gearing with the planetary pinions $o$, a worm-wheel $i$ made integral with pinion $f$, and a worm $j$ engaged with the wheel $i$ and fixed to an axle mounted on the frame and free to revolve in one direction or the opposite direction, substantially as and for the purpose set forth.

3. A pulley of variable diameter by hyperbolic deformation comprising a shaft $a$, two independent plates $d$ and $e$ loosely mounted on said shaft and arranged each like a cup the opening of which is turned toward the exterior, plates 1 and 2 closing tightly said cups, rods $v$ connecting the exterior parts of the plates out of the cups, and provided with means for automatically changing their length as the plates turn one with relation to the other, a cross-support $b$ keyed on the shaft $a$, fixed to the plate $d$ and arranged inside the cup formed by said plate, two planetary pinions $c$ mounted on the cross-support $b$, a pinion $g$ gearing with the planetary pinions $c$ and the hub of which traverses the plate 1 and is fixed to the frame, a second cross-support $t$ loosely mounted on shaft $a$, fixed to the plate $e$ and arranged in the cup formed by said plate, two planetary pinions $o$ mounted on the cross-support $t$, a pinion $f$ loosely mounted on shaft $a$ gearing with the planetary pinions $o$ and having its hub traversing the plate 2, means for driving from outside the pinion $f$, and a double pinion $r$ revolving loosely on the shaft $a$ and gearing simultaneously with the planetary pinions $c$ and $o$, substantially as and for the purpose set forth.

In witness whereof I have hereunto set my hand in presence of two witnesses.

CHARLES MONIN.

Witnesses:
ANTOINE LAVOIX,
HANSON C. COXEY.